(12) United States Patent
Kawa et al.

(10) Patent No.: US 7,487,392 B2
(45) Date of Patent: Feb. 3, 2009

(54) DATA STORAGE DEVICE, AND METHOD FOR REWRITING DATA IN NONVOLATILE MEMORY

(75) Inventors: Tadahisa Kawa, Kanagawa (JP); Atsushi Kanamaru, Kanagawa (JP); Tsuguaki Kowa, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 527 days.

(21) Appl. No.: 11/388,640

(22) Filed: Mar. 23, 2006

(65) Prior Publication Data

US 2006/0218437 A1  Sep. 28, 2006

(30) Foreign Application Priority Data

Mar. 23, 2005  (JP)  ............................. 2005-083765

(51) Int. Cl.
G06F 11/00 (2006.01)
(52) U.S. Cl. .......................... 714/15; 714/764; 717/168
(58) Field of Classification Search ....................... None
See application file for complete search history.

(56) References Cited

U.S. PATENT DOCUMENTS

| | | | | |
|---|---|---|---|---|
| 5,732,092 | A * | 3/1998 | Shinohara | 714/764 |
| 6,708,231 | B1 * | 3/2004 | Kitagawa | 710/10 |
| 7,073,017 | B2 * | 7/2006 | Yamamoto | 711/103 |
| 7,099,967 | B2 * | 8/2006 | Farkas et al. | 710/104 |
| 7,191,437 | B1 * | 3/2007 | Coatney et al. | 717/174 |
| 2004/0236932 | A1 * | 11/2004 | Zhang et al. | 713/1 |
| 2004/0237010 | A1 * | 11/2004 | Auclair et al. | 714/721 |
| 2005/0073884 | A1 * | 4/2005 | Gonzalez et al. | 365/185.02 |
| 2005/0144613 | A1 * | 6/2005 | Tseng | 717/168 |
| 2006/0212694 | A1 * | 9/2006 | Koizumi | 713/2 |
| 2006/0282896 | A1 * | 12/2006 | Qi | 726/25 |
| 2007/0022328 | A1 * | 1/2007 | Tarra et al. | 714/100 |
| 2007/0234332 | A1 * | 10/2007 | Brundridge et al. | 717/168 |

FOREIGN PATENT DOCUMENTS

| | | |
|---|---|---|
| JP | 2001-154916 | 6/2001 |
| JP | 2001-344156 | 12/2001 |
| JP | 2006-268272 | * 5/2006 |

* cited by examiner

Primary Examiner—Gabriel L Chu
(74) Attorney, Agent, or Firm—Townsend and Townsend and Crew LLP; Rambod Nader

(57) ABSTRACT

Data in a nonvolatile memory included in a data storage device is rewritten with higher security. According to one embodiment of the present invention, if an error is included in data stored in a nonvolatile semiconductor memory, the HDD rewrites correct data to the nonvolatile semiconductor memory. In particular, during the execution sequence of a write command, the HDD executes rewrite processing of control data stored in the nonvolatile semiconductor memory. More specifically, data is rewritten during a specified period of time that falls within a period of time starting from a start notification of write-data transfer processing that is sent from the HDD to the host, until a command completion notification. Since there is a very small possibility that the power of the host may be interrupted during this specified period of time, it is possible to securely rewrite data.

14 Claims, 7 Drawing Sheets

DATA STORAGE DEVICE, AND METHOD FOR REWRITING DATA IN NONVOLATILE MEMORY

CROSS-REFERENCES TO RELATED APPLICATIONS

This application claims priority from Japanese Patent Application No. JP2005-083765, filed Mar. 23, 2005, the entire disclosure of which is incorporated herein by reference.

BACKGROUND OF THE INVENTION

The present invention relates to data storage devices, and more particularly to a method for rewriting data stored in a nonvolatile memory.

Devices using various types of media, such as optical disks, magnetic tapes, and semiconductor memories, are known as data storage devices. Among them, hard disk drives (hereinafter referred to as "HDDs") have become popular as storage devices for computers to such an extent that they are one type of the storage devices indispensable for today's computer systems. Further, not limited to computers, their application is widening more and more due to the superior characteristics with the advent of moving picture recording/reproducing devices, car navigation systems, removable memories for digital cameras and so on.

A magnetic disk used in an HDD has a plurality of tracks that are concentrically formed. Each track is partitioned into a plurality of sectors (servo sectors). Servo data and user data are written to each servo sector. Here, the user data written to each servo sector ranges over a plurality of sectors (data sectors). A head element moves according to servo data. As a result, data can be written to or read from a desired address. A signal read out from a magnetic disk by the head element through data read processing is subjected to waveform shaping, decoding processing and other prescribed signal processing by a signal processing circuit before the signal is transmitted to a host. The data transmitted from the host is also subjected to prescribed processing by the signal processing circuit in like manner before the data is written to the magnetic disk by the head element.

Microcodes for controlling an HDD are in general stored in a nonvolatile ROM. A typical example of such a ROM is a flash memory. The flash memory is electrically rewritable, and is effective in upgrading microcodes. Error correction of data stored in a flash memory is performed by ECC (Error Correction Code). However, because there is a limit to the error recovery by means of ECC (Error Check and Correct) processing, it is preferable to rewrite error bits.

Here, if the power is turned OFF while data is rewritten to a flash memory, there arises a problem in that the data is not correctly rewritten, or that data stored in the flash memory is lost. Therefore, it is necessary to take measures against the possibility that the power may be turned OFF while data is written to a flash memory. For example, patent document 1 (Japanese Patent Laid-open No. 2001-344156) discloses a technique relating to flash memories that are generally used for rewriting. In this technique, there is provided a flash memory and nonvolatile storing means that is different from the flash memory. The nonvolatile storing means includes a flag area for storing a write state indicating how writing to a storage area of the flash memory is performed. By flagging rewritten blocks in a stage in which rewriting is completed, it is possible to check whether or not writing to the flash memory by download has been successfully completed.

BRIEF SUMMARY OF THE INVENTION

Data critical to the operation of an HDD, such as microcodes for controlling the HDD, is stored in a nonvolatile memory used in a data storage device. For this reason, it is necessary to securely perform the data rewrite processing, and accordingly to prevent to the utmost the power from being interrupted during the rewrite processing. Moreover, since in general a host controls the power of data storage devices, it is important to effectively prevent the power from being turned OFF by the host during the rewrite processing. The present invention has been made in view of such situations. A feature of the present invention is to rewrite, with higher security, data in a nonvolatile memory included in a data storage device.

According to a first aspect of the present invention, there is provided a data storage device that writes, to a medium, write data transferred from a host. This data storage device includes: a nonvolatile memory for storing data, the nonvolatile memory being electrically rewritable; and a controller for performing control operation according to data stored in the nonvolatile memory; wherein the controller executes rewrite processing of data stored in the nonvolatile memory during a specified period of time that falls within a period of time starting from a write-data transfer processing start notification sent to a host until a command completion notification. By executing the rewrite processing of data stored in the nonvolatile memory during a specified period of time that falls within a period of time starting from a write-data transfer processing start notification sent to a host until a command completion notification, it is possible to decrease the possibility that power may be turned OFF by the host during the rewrite processing, and accordingly to perform the data rewrite processing with higher security.

According to a second aspect of the present invention, in the first aspect, when data is read out from the nonvolatile memory and the data is loaded into a volatile memory, the controller executes error-correction processing, and registers information about an error location thereof, and then executes rewrite processing of data corresponding to the registered error location on the nonvolatile memory. Using the information acquired at the time of the error correction makes it possible to ensure efficient rewrite processing.

According to a third aspect of the present invention, in the first aspect, after the initialization processing performed when power is turned ON, the controller executes rewrite processing of data stored in the nonvolatile memory in an execution sequence of a first write command. This makes it possible to execute the rewrite processing without fail after the power is turned ON.

According to a fourth aspect of the present invention, after the completion of the rewrite processing in the first aspect, the controller returns the command completion notification to the host. As a result, even if it takes a long time to complete the rewrite processing, it is possible to effectively prevent the power from being interrupted during the rewriting processing.

According to a fifth aspect of the present invention, in the first aspect, the controller starts the rewrite processing of the control data in response to the write-data transfer processing start notification. This makes it possible to minimize the decrease in performance caused by rewrite processing.

According to a sixth aspect of the present invention, in a data storage device that writes, to a medium, write data transferred from a host, data is read out from a nonvolatile memory that is electrically rewritable, the data is loaded into a volatile memory, and error information about the loaded data is then registered. In addition, during a specified period of time that falls within a period of time starting from a write-data transfer processing start notification sent to a host until a command completion notification, rewrite processing of the data stored in the nonvolatile memory is executed with reference to the error information. This makes it possible to decrease the possibility that the power may be turned OFF by the host during the rewrite processing, and accordingly to perform the data rewrite processing with higher security.

According to a seventh aspect of the present invention, in the sixth aspect, when the data is loaded into the volatile memory, data correction processing is executed, and error-address information is registered. The registered error addresses can be used for the rewrite processing.

According to an eighth aspect of the present invention, in the sixth aspect, if the rewrite processing is not completed in the timing when the command completion notification can be transmitted to the host, the command completion notification is transmitted to the host after the completion of the rewrite processing. As a result, even if it takes a long time to complete the rewrite processing, it is possible to effectively prevent the power from being interrupted during the rewriting processing.

According to a ninth aspect of the present invention, after the initialization processing performed when the power is turned ON, in the sixth aspect, the rewrite processing is executed in an execution sequence of a first write command. This makes it possible to execute the rewrite processing without fail after the power is turned ON.

According to a tenth aspect of the present invention, there is provided a magnetic disk drive including: a magnetic disk to which write data transferred from a host is written; a nonvolatile semiconductor memory for storing control data, the nonvolatile semiconductor memory being electrically rewritable; and a controller for performing control operation according to control data stored in the nonvolatile semiconductor memory; wherein when data is read out from the nonvolatile memory and the data is loaded into a volatile memory, the controller executes error-correction processing, and registers information about an error location thereof; and after the initialization processing performed when the power is turned ON, in an execution sequence of a first write command, the controller executes rewrite processing of rewriting, to the nonvolatile memory, data corresponding to the registered error location during a specified period of time that falls within a period of time starting from a write-data transfer processing start notification sent to a host until a command completion notification. This makes it possible to decrease the possibility that the power may be turned OFF by the host during the rewrite processing, and accordingly to perform the data rewrite processing with higher security.

According to an eleventh aspect of the present invention, after the completion of the write command processing, in the tenth aspect, the controller judges whether or not the rewrite processing to the nonvolatile memory has been completed, and after the rewrite processing is completed, the controller transmits the command completion notification to the host. As a result, even if it takes a long time to complete the rewrite processing, it is possible to effectively prevent the power from being interrupted during the rewriting processing.

According to the present invention, it is possible to rewrite, with higher security, data in a nonvolatile memory included in a data storage device.

DETAILED DESCRIPTION OF THE INVENTION

Figure 1:
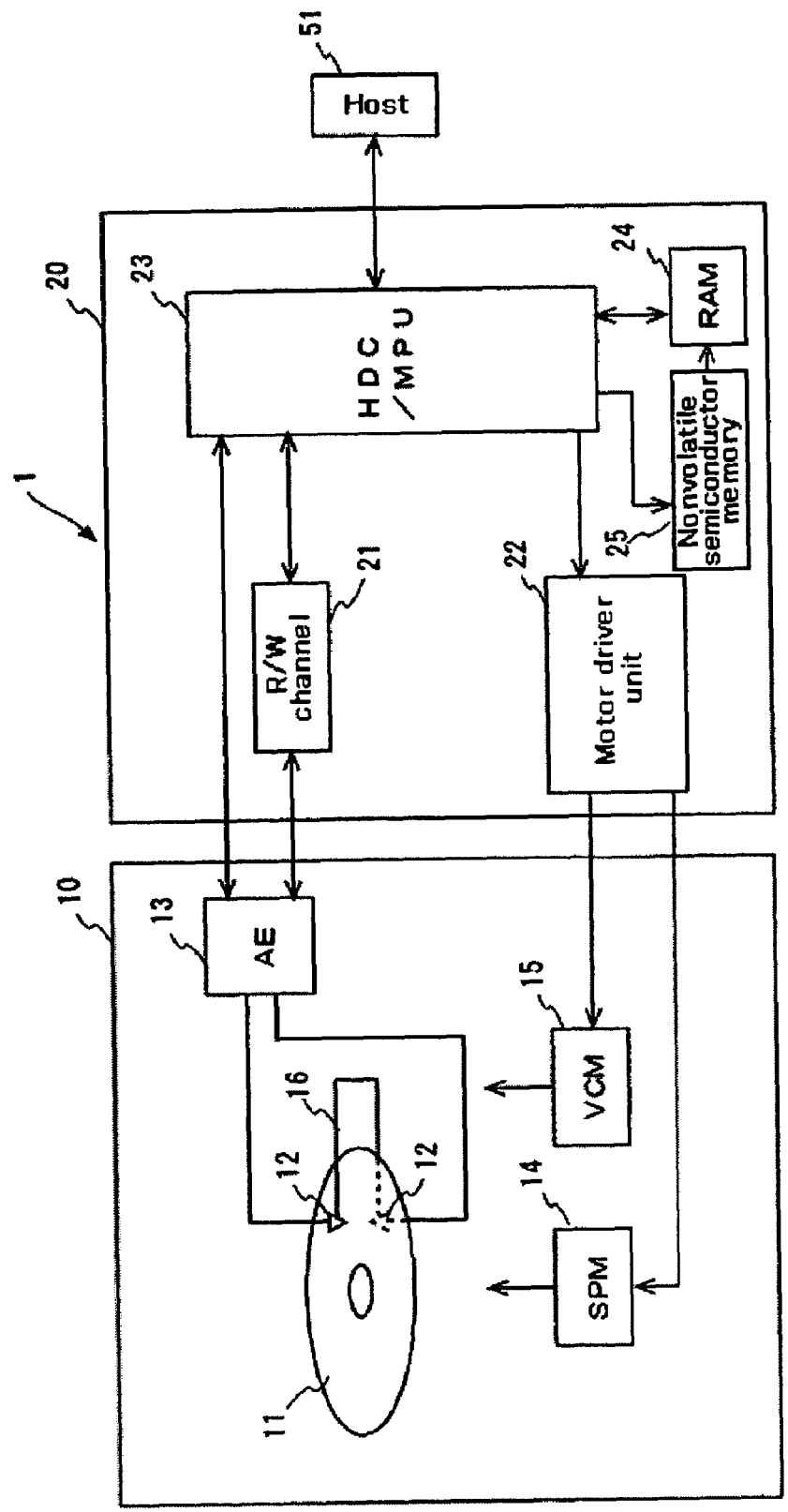
FIG. 1 is a block diagram schematically illustrating a configuration of an HDD according to an embodiment of the invention.

Embodiments of the present invention will be described below. For clarification of the explanation, omission and simplification are made, where appropriate, in the following description and drawings. Also note that identical reference numerals are used to designate identical elements that are common to the figures and redundant description is omitted as appropriate for clarification of the explanation.

Specific embodiments to which the present invention is applied will be described in detail with reference to drawings. This embodiment relates to how to control, in a data storage device, data rewrite processing of a nonvolatile memory to which control data is written. First of all, for easier understanding of the present invention, a configuration of a hard disk drive (HDD), which is an example of data storage devices, will be schematically described as a whole.

FIG. 1 is a block diagram schematically illustrating a configuration of a HDD 1 according to this embodiment. As shown in FIG. 1, the HDD 1 includes, in a sealed enclosure 10, a magnetic disk 11 that is an example of media (recording media), head elements 12, arm electronics (AE) 13, a spindle motor (SPM) 14, a voice coil motor (VCM) 15, and an actuator 16.

The HDD 1 further includes a circuit board 20 that is externally secured to the enclosure 10. On the circuit board 20, there are provided ICs including: a read/write channel (R/W channel) 21; a motor driver unit 22; a hard disk controller (HDC) and an MPU integrated circuit (hereinafter referred to as "HDC/MPU") 23; and a RAM 24 that is an example of volatile memories. Incidentally, the above-mentioned circuits can be integrated into one IC; or each circuit can be implemented by dividing the circuit into a plurality of ICs.

Write data from an external host 51 is received by the HDC/MPU 23, and is sent through the R/W channel 21 and the AE 13. Then, the head element 12 writes the write data to the magnetic disk 11, which is a nonvolatile recording medium. In addition, read data stored on the magnetic disk 11 is read out by the head element 12. This read data is sent through the AE 13 and the RJW channel 21, and is then output from the HDC/MPU 23 to the external host 51.

Next, each component of the HDD 1 will be described. The magnetic disk 11 is secured to the SPM 14. The SPM 14 rotates the magnetic disk 11 at specified speed. The motor driver unit 22 drives the SPM 14 according to control data sent from the HDC/MPU 23. The magnetic disk 11 according to this embodiment has recording surfaces on both sides. Data is written to each of the recording surfaces. The head elements 12 are provided to be associated with the respective recording surfaces.

Each head element 12 is secured to a slider (not illustrated in the figure). The slider is secured to the actuator 16. The actuator 16 is connected to the VCM 15. The actuator 16 pivotally moves about a pivot shaft, which causes the head element 12 (and the slider) to move in the radial direction on the magnetic disk 11. The motor driver unit 22 drives the VCM 15 according to control data sent from the HDC/MPU 23.

The head element 12 typically includes: a write head for converting an electric signal into a magnetic field according to data to be written to the magnetic disk 11; and a read head for converting a magnetic field received from the magnetic disk 11 into an electric signal. It is to be noted that the required number of the magnetic disks 11 is one or more, and that a recording surface can be formed on one side, or both sides, of the magnetic disk 11.

Next, each circuit component will be described. The AE 13 selects from among the plurality of head elements 12 one head element 12 that is used to access data, and amplifies (preamplifies) at constant gain a read signal read by the selected head element 12, and then transmits the amplified signal to the R/W channel 21. In addition, the AE 13 sends a write signal, which is received from the R/W channel 21, to the selected head element 12.

The R/W channel 21 performs write processing on the data transferred from the host 51. In the write processing, the R/W channel 21 performs code modulation of write data supplied from the HDC/MPU 23, and then converts the code-modulated write data into a write signal to supply the write signal to the AE 13. Moreover, when data is supplied to the host 51, read processing is performed. In the read processing, the RIW channel 21 amplifies a read signal supplied from the AE 13 so that the amplitude is kept constant, and then extracts data from the obtained read signal to perform decode processing. Data that is read out includes user data and servo data. The decoded read data is supplied to the HDC/MPU 23.

In the HDC/MPU 23, the MPU operates according to microcodes loaded into the RAM 24. When the HDD 1 is started up, as control data, not only microcodes to operate on the MPU but also data required for control and data processing are loaded into the RAM 24 from the magnetic disk 11 or a nonvolatile semiconductor memory 25. The HDC/MPU 23 executes processing required for data processing such as management of command execution order, positioning control of the head elements 12, interface control, and defect control, and also executes the total control of the HDD 1.

The HDC/MPU 23 according to this embodiment executes rewrite processing of control data stored in the nonvolatile semiconductor memory 25. Even if the power is turned OFF, data stored in the nonvolatile semiconductor memory 25 is not lost. In addition, the data stored in the nonvolatile semiconductor memory 25 according to this embodiment can be electrically rewritten.

Since an error of control data causes the HDD 1 to enter an inoperative state, it is necessary to ensure the security of the control data. If an error is included in data stored in the nonvolatile semiconductor memory 25, it is possible to recover the fixed number of error bits by executing ECC processing. However, since there is a limit to the extent to which the recovery can be achieved by the ECC processing, it is desirable to rewrite error bits.

Thus, a flash memory is a typical example of the nonvolatile semiconductor memory 25 to which rewriting can be electrically made. A NOR flash memory and a NAND flash memory are known as flash memories. The NOR flash memory is a memory to which writing can be made on a byte basis. On the other hand, the NAND flash memory is a memory to which writing can be made on a block basis. However, a write rate of the NAND flash memory is higher than that of the NOR flash memory. In this embodiment, both types of the flash memories can be used. In another case, besides them, a FeRAM which uses a ferroelectric thin film material as a storage element can be used as a nonvolatile semiconductor memory to which rewriting can be electrically made.

If an error is included in the data stored in the nonvolatile semiconductor memory 25, the HDC/MPU 23 corrects the error, and then rewrites the correct data to the nonvolatile semiconductor memory 25. In particular, in this embodiment, the HDC/MPU 23 executes rewrite processing of control data stored in the nonvolatile semiconductor memory 25 during an execution sequence of a write command. To be more specific, data is rewritten during a specified period of time that falls within a period of time starting from a start notification of write-data transfer processing, which is sent from the HDD 1 to the host 51, until a command completion notification. Since there is a very small possibility that the power of the host 51 may be interrupted during this specified period of time, it is possible to securely rewrite data.

Which part of the period of time starting from the start notification until the completion notification is used as the specified period of time depends on the design. However, it is desirable to start the rewrite processing in response to the start notification of the write-data transfer processing. As a result, if a command completion notification is transmitted upon completion of the rewrite processing, it is possible to suppress the delay in the transmission of the command completion notification.

Figure 2:
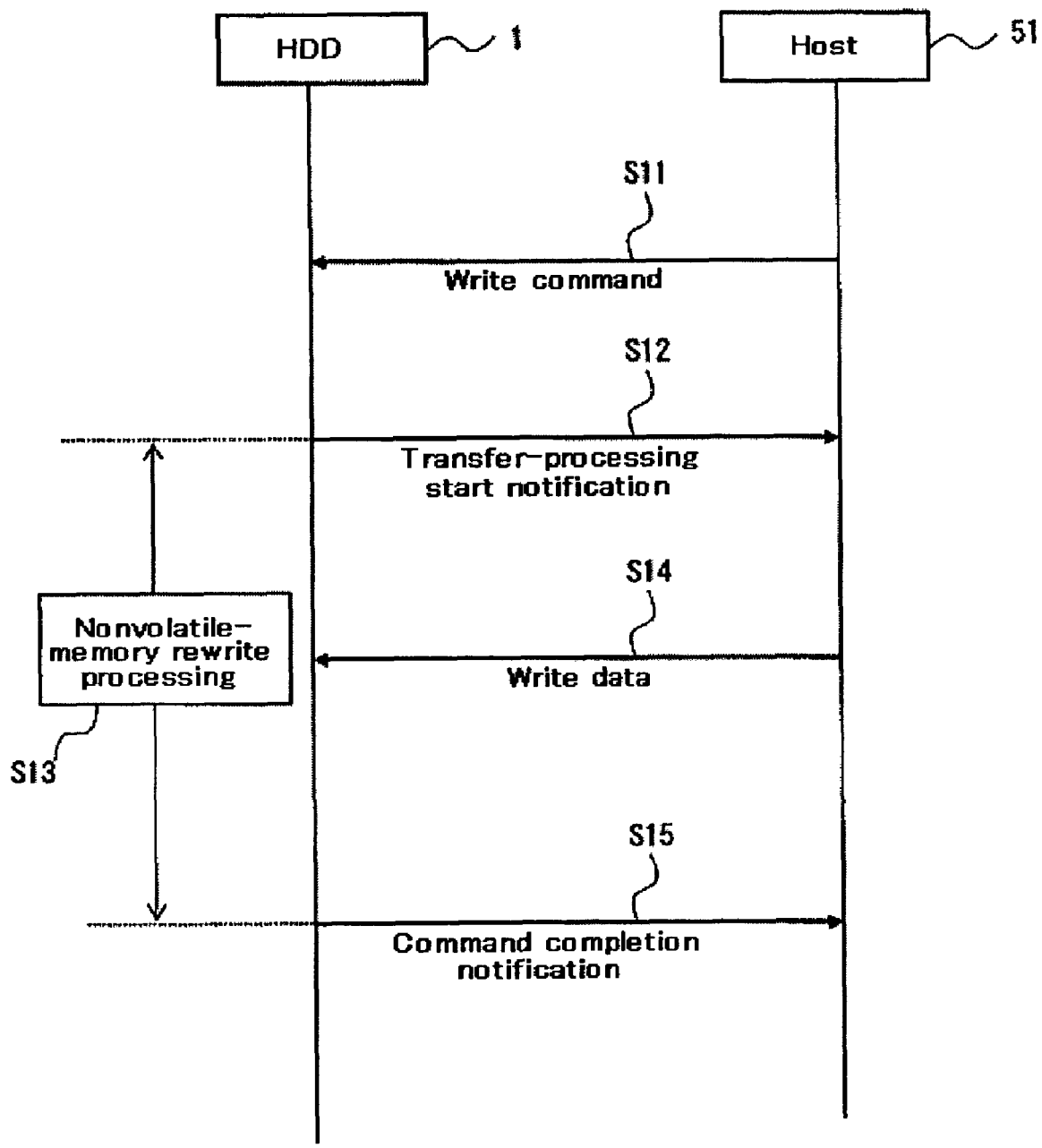
FIG. 2 is a sequence diagram illustrating a write-command execution sequence including rewrite processing of rewriting to a nonvolatile semiconductor memory, according to the embodiment.

A description will be made with reference to a sequence diagram in FIG. 2 of how rewriting to the nonvolatile memory 25 is performed in a write-command execution sequence between the HDD 1 and the host 51. The host 51 issues a write command to the HDD 1 (S11). After the HDD 1 receives the write command, as soon as the HDD is ready to receive write data thereof, the HDD 1 transmits a write-data transfer processing start notification to the host 51 (S12). In addition, after transmitting the write-data transfer processing start notification, the HDD 1 starts rewrite processing (S13) of rewriting to the nonvolatile semiconductor memory 25. In parallel with the rewrite processing (S13), the HDD 1 receives the write data from the host 51 (S14). After the transfer of the write data ends, as soon as the write data is stored in a write buffer (write cache is ON), or is written to the magnetic disk 11 (write cache is OFF), the HDD 1 enters a state in which the HDD 1 can transmit a completion notification of this write command to the host 51.

If the rewrite processing (S13) is completed in this timing, the HDD 1 transmits the command completion notification to the host (S15). On the other hand, if the rewrite processing (S13) is not completed, the HDD 1 delays the transmission of the command completion notification until the completion of the rewrite processing (S13). Then, on completion of the rewrite processing (S13), the HDD 1 transmits the command completion notification to the host 51.

In this way, the rewrite processing is performed on the nonvolatile semiconductor memory 25 during a period of time starting when the HDD 1 notifies the host 51 of the start of the write-data transfer processing until the command completion notification is returned to the host 51. Therefore, there is a very low possibility that the power of the HDD 1 may be turned OFF during the rewrite processing. Accordingly, it is possible to perform rewriting processing on the nonvolatile semiconductor memory 25 with the security of control data being ensured.

Figure 3:
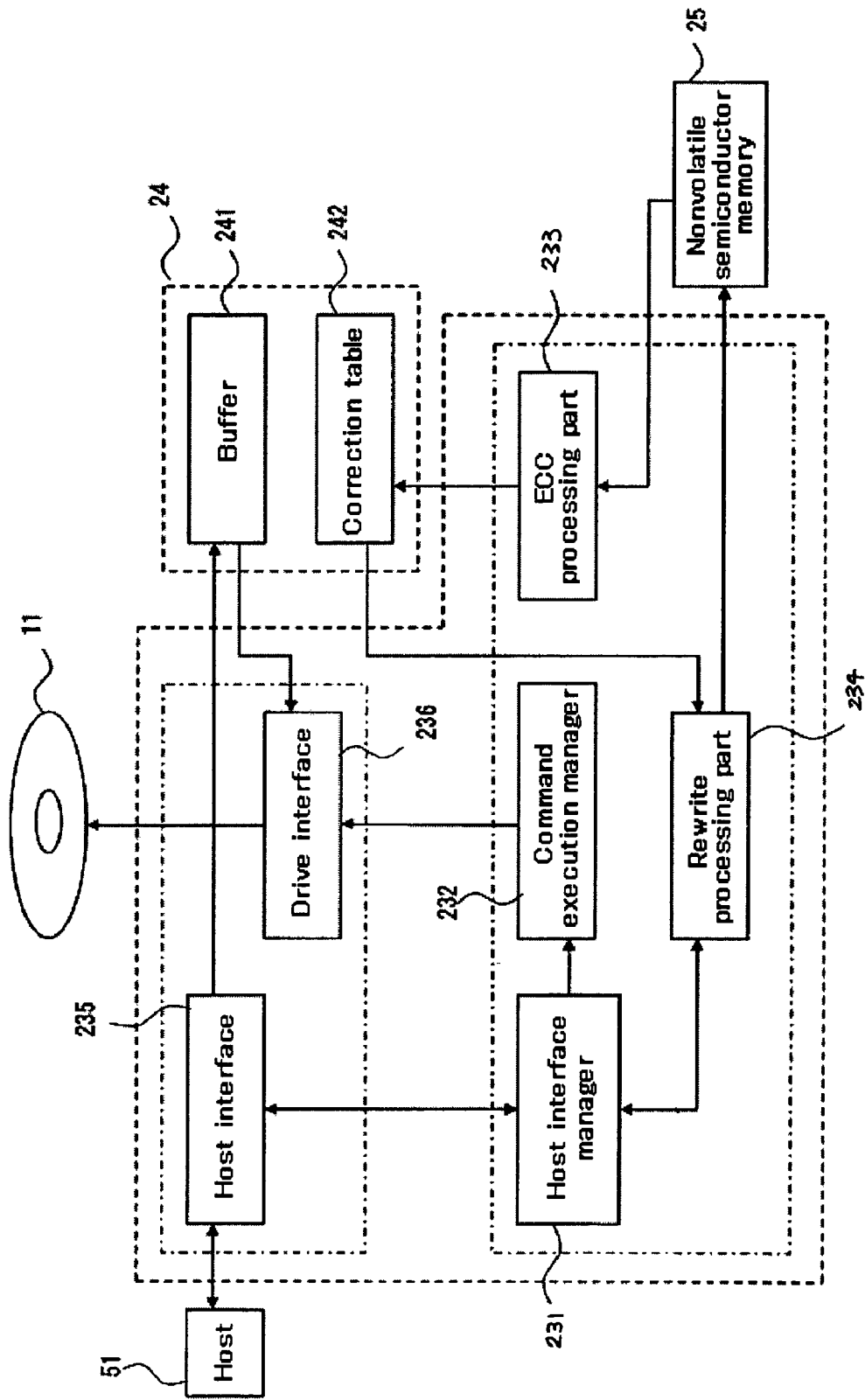
FIG. 3 is a block diagram schematically illustrating part of a circuit configuration of an HDC/MPU according to this embodiment.

Next, a detailed description will be made of processing in the HDD 1, relating to rewriting to the nonvolatile semiconductor memory 25 with reference to FIGS. 2 and 3. FIG. 3 is a block diagram partially illustrating a configuration of the HDD 1. FIG. 3 illustrates components relating to a write-command execution sequence including rewrite processing of rewriting to a nonvolatile semiconductor memory. It is to be noted that the AE 13 and the R/W channel 21 are omitted. In FIG. 3, a host interface manager 231, a command execution manager 232, an ECC processing part 233, and a rewrite processing part 234 function as a result of the operation of the MPU according to microcodes.

A host interface 235 and a drive interface 236 are implemented as hardware in the HDC/MPU 23. A buffer 241 and a correction table 242 are reserved as a data area in the RAM 24. Incidentally, in the HDC/MPU 23, a method for implementing each functional block by software or hardware can be determined by design.

In the initialization processing (POR processing: Power On Reset) when the power is turned ON, the HDD 1 loads, into the RAM 24, control data including microcodes stored in the nonvolatile semiconductor memory 25. At this time, error correction processing of data stored in the nonvolatile semiconductor memory 25 is performed by required ECC. If an error is corrected, a correction table 242 is formed in the RAM 24. The MPU which functions as the ECC processing part 233 performs the ECC processing, and generates the correction table 242.

When a first write command is issued from the host 51 (S11), the host interface manager 231 receives it through the host interface 235. Upon being ready to receive write data, the host interface manager 231 transmits a write-data transfer start notification to the host 51 through the host interface 235 (S12). Moreover, the host interface manager 231 makes a judgment as to whether or not the write command is the first write command after the POR processing.

If judging the write command to be the first write command, the host interface manager 231 instructs the rewrite processing part 234 to perform rewriting to the nonvolatile semiconductor memory 25. By executing the rewrite processing (S13) in the timing when the first write command is executed, it is possible to reliably perform the error correction of the control data during the operation of the HDD 1, and thereby to increase the security of data. If it is judged that the write command is not the first write command, the rewrite processing is not executed.

On receipt of the rewrite-processing instruction from the host interface manager 231, the rewrite processing part 234 refers to the correction table 242 stored in the RAM 24 so as to obtain information as to whether or not there are correction bits, and the correction location (address) thereof. If error-correction processing is performed by the ECC processing part 233 on any of the bits, the rewrite processing part 234 starts the rewrite processing of rewriting to the nonvolatile semiconductor memory 25 (S13). Incidentally, the rewrite processing part 234 controls a rewrite circuit configured in the HDC/MPU 23 so as to perform actual rewrite processing.

In parallel with the rewrite processing, the write data that has been transferred from the host 51 is stored in the buffer 241 included in the RAM 24 through the host interface 235 (S14). As soon as the write data is stored in the buffer 241, the command execution manager 232 instructs the drive interface 236 to write the data to the magnetic disk 11. In parallel with the receive processing of the write data from the host 51, the drive interface 236 transfers, to the magnetic disk 11 (R/W channel 21), the write data stored in the buffer 241.

If the write cache is in an ON state, in a stage where all write data has been stored in the buffer 241, the host interface manager 231 judges that the rewrite processing to the nonvolatile semiconductor memory 25 has been completed. On the completion of the rewrite processing, the rewrite processing part 234 notifies the host interface manager 231 of the completion. If the write cache is in an OFF state, after all write data is written to the magnetic disk 11, the host interface manager 231 judges that the rewrite processing has been completed.

If the rewrite processing is not completed, the host interface manager 231 waits for a notification from the rewrite processing part 234. On receipt of the notification of the rewrite-processing completion from the rewrite processing part 234, the host interface manager 231 transmits a write-command completion notification to the host 51 through the host interface 235 (S15). On the other hand, if the rewrite processing is completed, the host interface manager 231 transmits a write-command completion notification to the host 51 through the host interface 235 (S15).

Figure 4:
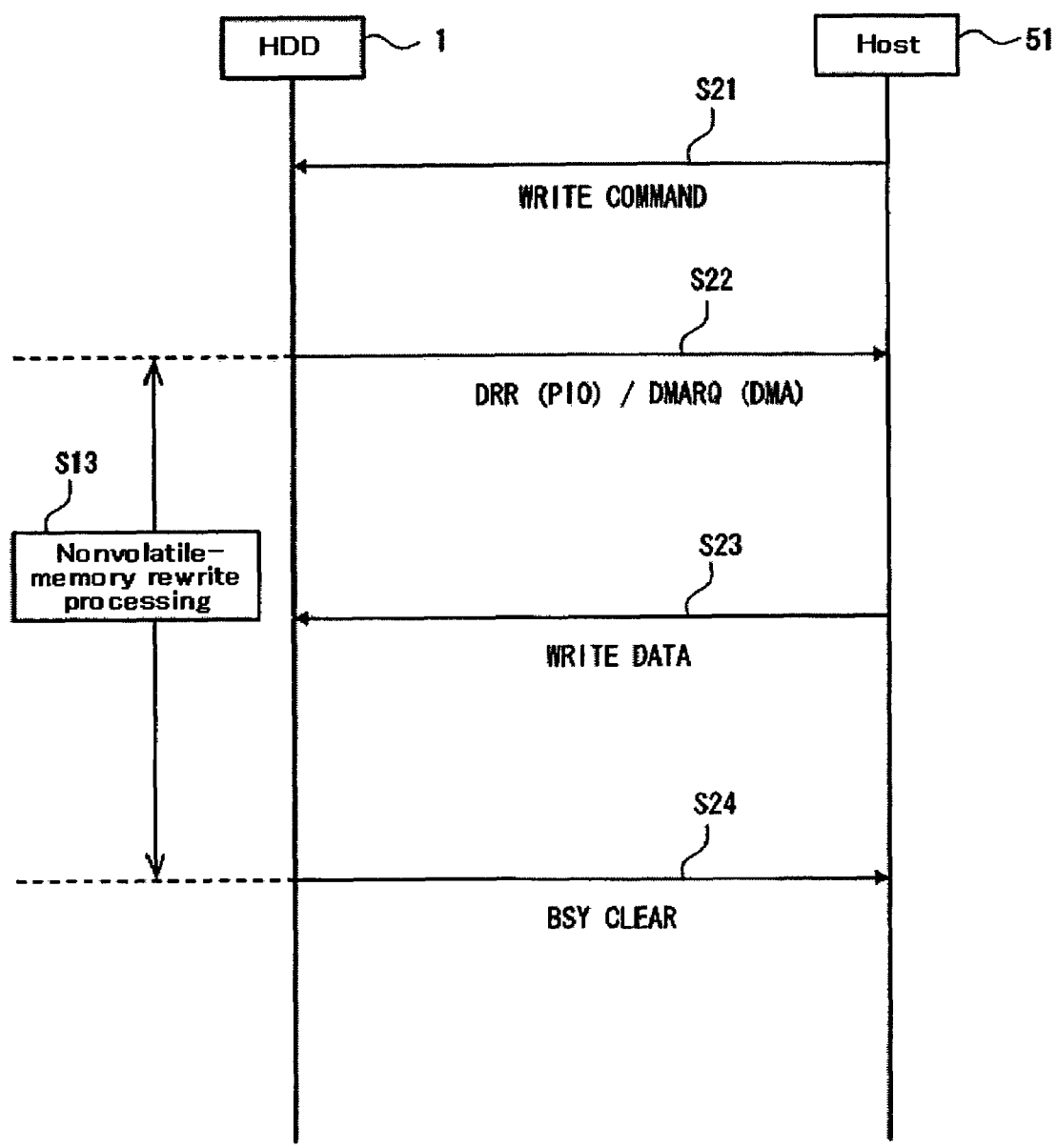
FIG. 4 is a sequence diagram illustrating rewrite processing to a nonvolatile semiconductor memory in an execution sequence of ATA command (PIO/DMA) according to this embodiment.

A description will be made below of an example in which data rewrite processing according to this embodiment is applied to several types of host interfaces used in an HDD. First of all, taking an ATA interface as an example, rewrite processing of rewriting control data to the nonvolatile semiconductor memory 25 by the HDD 1 will be described. Regardless of transfer modes including PIO (Programmed IO) and DMA (Direct Memory Access), data rewrite processing according to this embodiment can be applied to the ATA interface. FIG. 4 is a sequence diagram illustrating write-data transfer, and processing of the nonvolatile semiconductor memory 25, used in the ATA interface.

With reference to FIG. 4, first of all, a write command is issued from the host 51 to the HDD 1 (S21). To be more specific, the write command includes address information and a command code. The address information of write data is first transmitted from the host 51 to the HDD 1. More specifically, the address information to be transmitted includes: a write start address at which writing to the magnetic disk 11 is started; and the number of sectors (the amount of data) of the write data to be written. The address is typically specified by an LBA (Logical Block Address). After that, the HDD 1 receives a write code from the host. Here, the issuance of the write command means that the host 51 writes the write code to a register of the HDD 1.

After receipt of the write command, upon being ready to receive write data thereof, the HDD 1 outputs a write-data transfer processing start notification to the host 51 (S22). To be more specific, the HDD 1 makes a DRQ (Data ReQuest) bit of a status register active in a PIO transfer mode. In a DMA transfer mode, the HDD 1 activates a DMARQ (DMA ReQuest) signal.

After outputting the write-data transfer processing start notification to the host 51, the HDD 1 starts data rewrite processing to the nonvolatile semiconductor memory 25 (S13). On receipt of the write-data transfer processing start notification, the host 51 transfers the write data to the HDD 1 (S23). After the host 51 starts the transfer of the write data, the HDD 1 performs receive processing of write data in parallel with the data rewrite processing to the nonvolatile semiconductor memory 25. Typically, the HDD 1 temporarily stores the received data in the buffer 241 included in the RAM 24. Moreover, the HDD 1 writes the received write data to the magnetic disk 11.

Here, if the write cache is in the ON state, the HDD 1 can transmit a write-command completion notification to the host 51 in the timing when all write data has been stored in the buffer 241. On the other hand, if the write cache is in the OFF state, the HDD 1 returns the command completion notification to the host 51 after completion of writing the write data to the magnetic disk 11. To be more specific, as a command completion notification, a BSY bit of the status register is cleared (S24).

Regardless of a state of the write cache, in other words, both in the ON state and in the OFF state, the HDD 1 according to this embodiment waits until completion of the data rewrite processing to the nonvolatile semiconductor memory 25. Then, the HDD 1 transmits a command completion notification to the host 51. If the data rewrite processing to the nonvolatile semiconductor memory 25 is not completed in the timing when the HDD 1 can transmit a command completion notification to the host 51, the HDD 1 delays the transmission of the command completion notification.

Usually, the host 51 does not turn the power OFF before the host 51 receives a write-command completion notification. For this reason, a command completion notification is transmitted after the data rewrite processing to the nonvolatile semiconductor memory 25 is completed. This makes it possible to prevent the power from being turned OFF during the rewrite processing, and accordingly to prevent data of the nonvolatile semiconductor memory 25 from being lost.

Next, an example of the SATA (Serial ATA) interface will be described. The SATA interface includes seven specified data transfer modes: a PIO (Programmed Input Output) data-in command (read), a PIO data-out command (write), a Read DMA (Direct Memory Access) command, a Write DMA command, a Read FPDMA (First Party DMA) Queued command, a Write FPDMA Queued command, and a Non-data command. Here, a write command corresponds to three transfer modes of the PIO data-out command, the Write DMA command, and the Write FPDMA Queued command. The data rewrite processing to the nonvolatile semiconductor memory 25 in this embodiment may be applied to a write command in any of these transfer modes.

Figure 5:
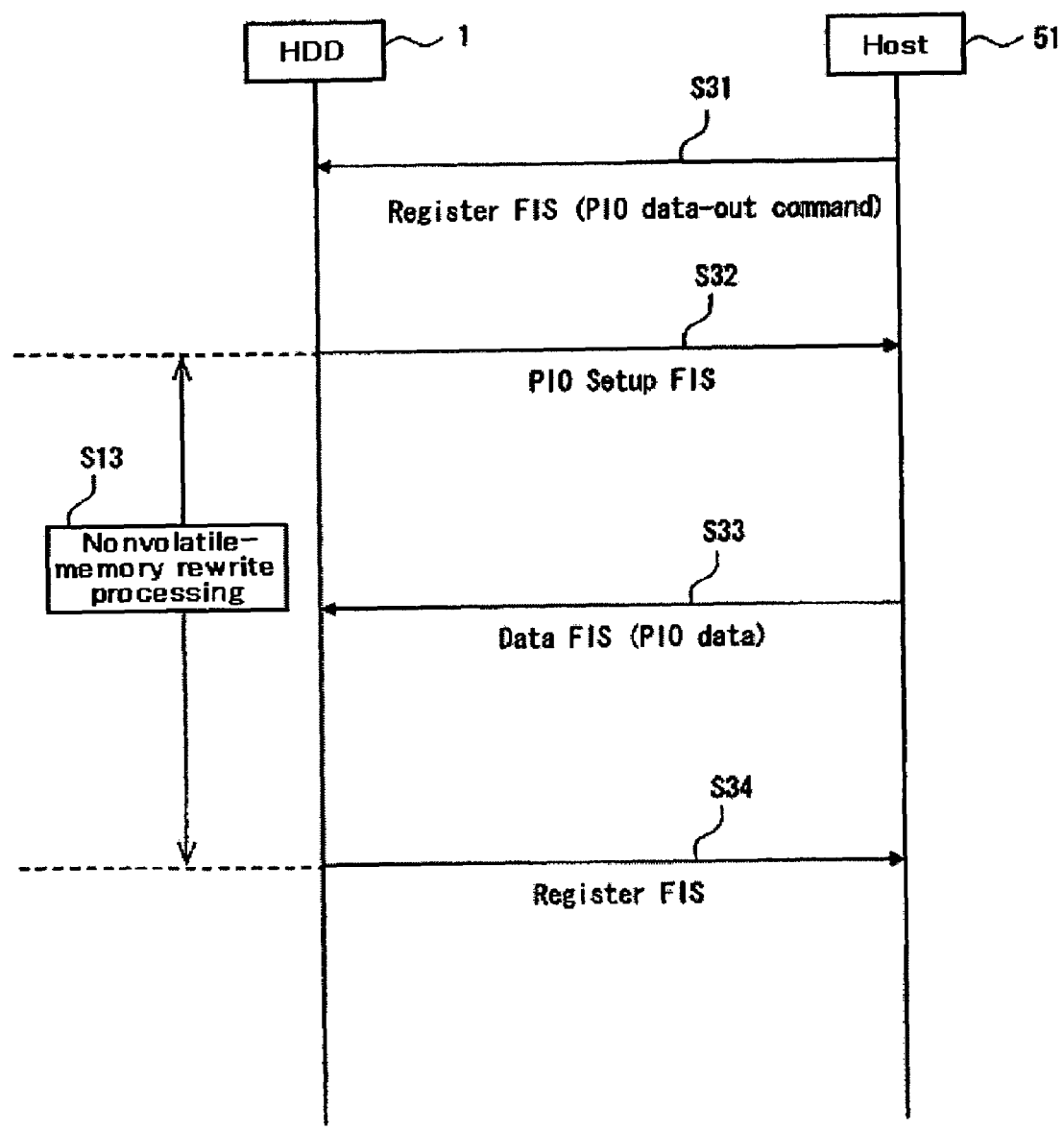
FIG. 5 is a sequence diagram illustrating rewrite processing to a nonvolatile semiconductor memory in an execution sequence of SATA PIO command according to this embodiment.

A specific described will be made below. An execution sequence of the PIO data-out command will be described with reference to FIG. 5. A PIO data-out command protocol specifies data write in a PIO mode. The host 51 transmits, to the HDD 1, Register FIS that includes the PIO data-out command (S31). After receipt of the PIO data-out command, upon being ready to receive write data thereof, the HDD 1 transmits, to the host 51, PIO Setup FIS (Frame Information Structure), which indicates the start of data transfer processing and a data transfer request (S32). It is to be noted that FIS is one unit of data frame.

After outputting the PIO Setup FIS to the host 51, the HDD 1 starts data rewrite processing of rewriting to the nonvolatile semiconductor memory 25 (S13). On receipt of the PIO Setup FIS, the host 51 transmits, to the HDD 1, Data FIS that includes write data (PIO data). The HDD 1 performs receive processing of write data in parallel with the data rewrite processing to the nonvolatile semiconductor memory 25 (S33).

After all data is received and command processing is completed, judgment is made as to whether or not the data rewrite processing to the nonvolatile semiconductor memory 25 has been completed. If it is judged that the data rewrite processing has been completed, the HDD 1 transmits, to the host 51, Register FIS as a completion notification (S34). If it is judged that the data rewrite processing has not been completed yet, the HDD 1 waits until the completion, and then transmits the Register FIS. Incidentally, the relationship between the completion of command processing and a write cache function is similar to that in the ATA interface. Other SATA command processing described below is similar on this point.

Figure 6:
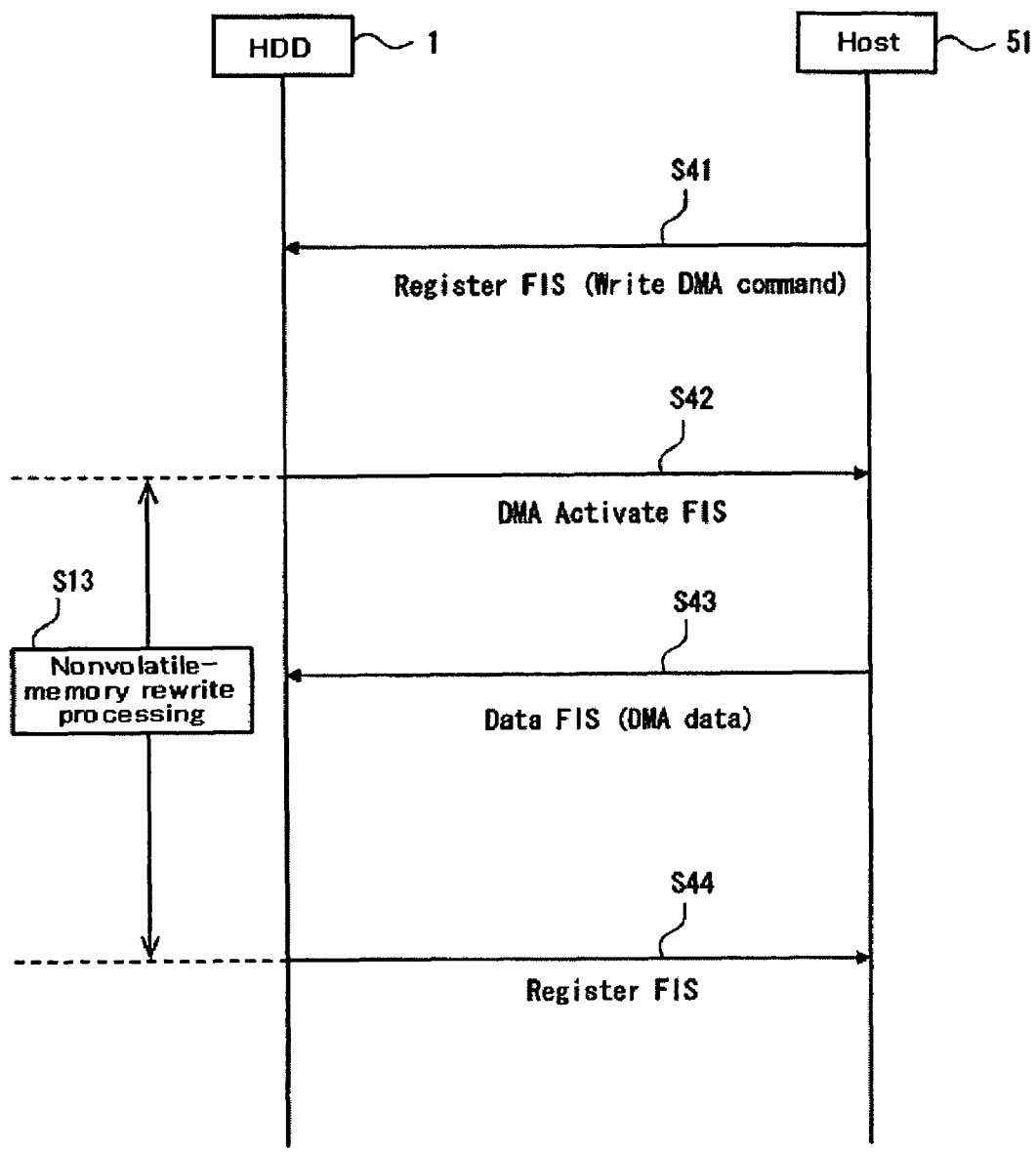
FIG. 6 is a sequence diagram illustrating rewrite processing to a nonvolatile semiconductor memory in an execution sequence of SATA Write DMA command according to this embodiment.

Next, an execution sequence of the Write DMA command will be described with reference to FIG. 6. A Write DMA command protocol specifies data write in a DMA mode. The host 51 transmits, to the HDD 1, Register FIS that includes the Write DMA command (S41). In response to this Register FIS, the HDD 1 indicates the start of data transfer processing, and also transmits DMA Activate FIS that requests data transfer (S42).

After outputting the DMA Activate FIS to the host 51, the HDD 1 starts data rewrite processing of rewriting to the nonvolatile semiconductor memory 25 (S13). Upon receipt of the DMA Activate FIS, the host 51 transmits, to the HDD 1, Data FIS that includes write data (DMA data) (S43). The HDD 1 performs receive processing of write data in parallel with the data rewrite processing to the nonvolatile semiconductor memory 25.

After all data is received and command processing is completed, the HDD 1 enters a state in which it is possible to transmit Register FIS as a completion notification to the host 51. The HDD 1 judges that the data rewrite processing to the nonvolatile semiconductor memory 25 has been completed, and then transmits Register FIS to the host 51 (S44).

Figure 7:
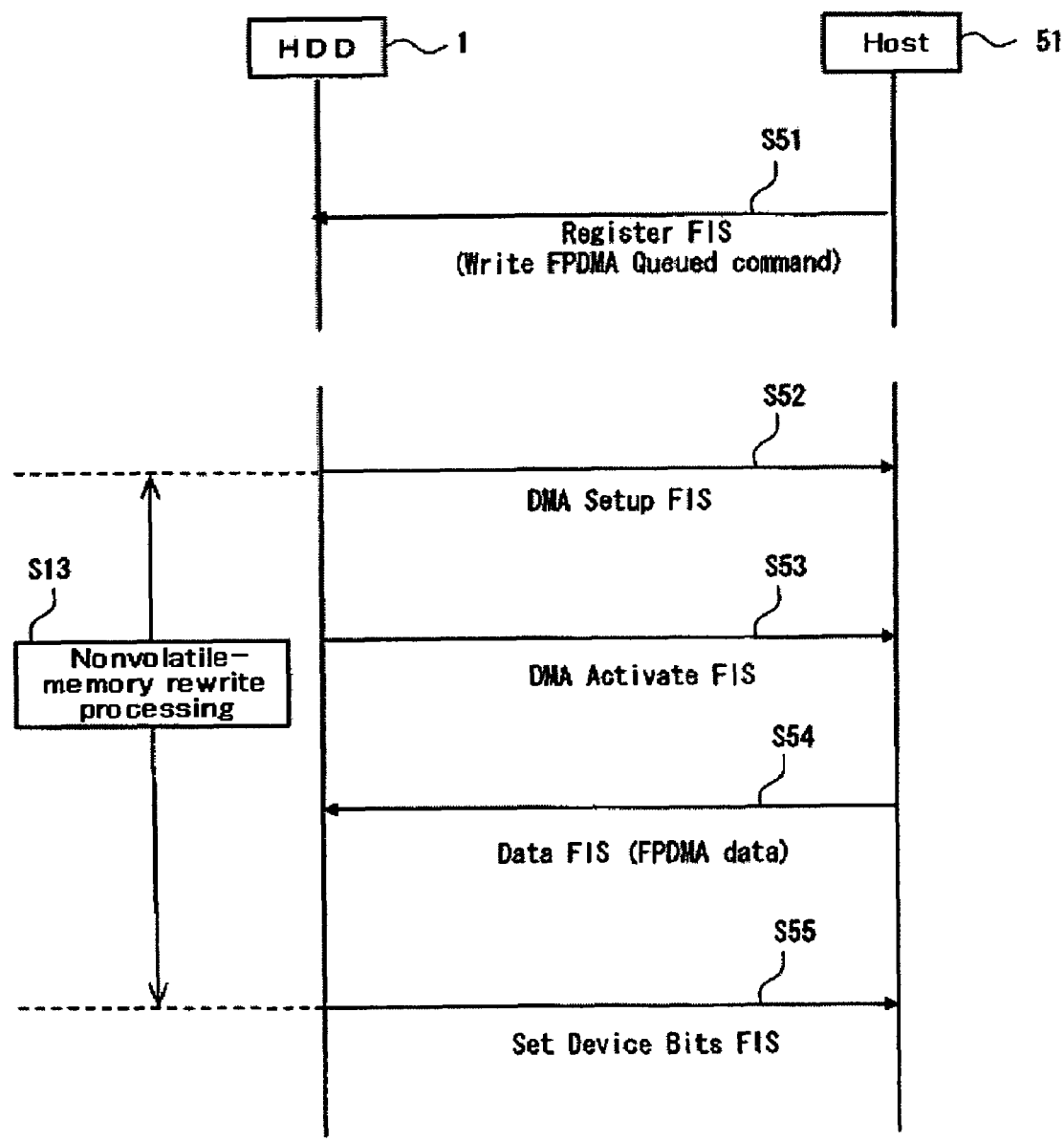
FIG. 7 is a sequence diagram illustrating rewrite processing to a nonvolatile semiconductor memory in an execution sequence of SATA Write FPDMA command according to this embodiment.

Lastly, the Write FPDMA Queued command mode will be described. Since the Write FPDMA Queued command protocol makes use of command queuing, the issuance of a command is independent of the execution thereof. Accordingly, the issuance order of commands does not always agree with the execution order of them. With reference to FIG. 7, first of all, the host 51 transmits, to the HDD 1, Register FIS that includes the Write FPDMA Queued command (S51). The HDD 1 queues the received Write FPDMA Queued command.

In a stage where the queued Write FPDMA Queued command is executed, the HDD 1 transmits to the host 51 DMA Setup FIS, which indicates the start of data transfer processing corresponding to the above-mentioned command (S52). After outputting the DMA Setup FIS to the host 51, the HDD 1 starts data rewrite processing of rewriting to the nonvolatile semiconductor memory 25 (S13). After that, the HDD 1 transmits to the host 51 DMA Activate FIS, which requests data transfer (S52).

On receipt of the DMA Activate FIS for write data, the host 51 transfers the write data to the HDD 1. More specifically, upon receipt of the DMA Activate FIS, the host 51 transfers, to the HDD 1, Data FIS that includes write data (FPDMA data) (S54). Incidentally, if the data is divided into a plurality of Data FISs before the data is transferred, the HDD 1 transmits DMA Setup FIS before transmitting the first DMA Activate FIS, and then transmits DMA Activate FIS without transmitting DMA Setup FIS.

After the host 51 starts the transfer of Data FIS including the write data, the HDD 1 performs receive processing of the write data in parallel with the data rewrite processing to the nonvolatile semiconductor memory 25. After. all data is received and write command processing is completed, the HDD 1 transmits, to the host 51, Set Device Bits FIS as a completion notification (S55).

As described in the above examples, by rewriting to the nonvolatile semiconductor memory during the period of time starting from the write-data transfer processing start notification until the command completion notification, it is possible to effectively prevent the power from being interrupted during the rewriting. Incidentally, in each of the above examples, the rewrite processing is immediately started in response to the start of the data transfer processing. However, it is also possible to design the specified period so that, for example, in FPDMA, after respondence to transmission of DMA Activate FIS, the rewrite processing is started.

Incidentally, the above description has been made of the embodiments according to the present invention, and is not intended to limit the scope of the present invention to the embodiments. Those skilled in the art will be able to easily make modifications, additions and alternations to each element of the above embodiments within the scope of the preset invention. For example, the scope of the present invention is not limited to the ATA and SATA interfaces. In addition, the relationship between each processing and the logical configuration is not limited to the above examples. Designers can design data storage devices by use of effective functions and effective circuit configurations. Incidentally, although the present invention is in particular useful for magnetic disk storage devices, the present invention can also be apply to other types of data storage devices that drive recording mediums, including an optical-disk storage device from which an optical disk such as a CD can be removed, and a data storage device that uses a semiconductor recording medium.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device that writes, to a medium, write data transferred from a host, said data storage device comprising:
    a nonvolatile memory configured to store data, said nonvolatile memory being electrically rewritable; and
    a controller configured to perform control operation according to data stored in the nonvolatile memory;
    wherein said controller executes rewrite processing of data stored in the nonvolatile memory during a specified period of time that falls within a period of time starting from a write-data transfer processing start notification sent to a host until a command completion notification sent to the host.

2. A data storage device according to claim 1, wherein:
    when data is read out from the nonvolatile memory and is loaded into a volatile memory, said controller executes error-correction processing and registers information about an error location thereof, and then performs rewrite processing of data corresponding to the registered error location on the nonvolatile memory.

3. A data storage device according to claim 1, wherein:
    after initialization processing performed when power is turned ON, said controller executes rewrite processing of data stored in the nonvolatile memory in an execution sequence of a first write command.

4. A data storage device according to claim 1, wherein:
    after completion of the rewrite processing, said controller returns the command completion notification to the host.

5. A data storage device according to claim 4, wherein:
    if a write cache of the data storage device is in an ON state, when all write data of the rewrite processing has been stored in a buffer, the rewrite processing is completed; and
    if the write cache of the data storage device is in an OFF state, when all write data of the rewrite processing has been written to the medium, the rewrite processing is completed.

6. A data storage device according to claim 1, wherein:
    said controller starts the rewrite processing of the control data in response to the write-data transfer processing start notification.

7. A nonvolatile-memory rewriting method for a data storage device that writes, to a medium, write data transferred from a host, said method comprising:
    reading out data from a nonvolatile memory that is electrically rewritable, and loading the data into a volatile memory, and then registering error information about the loaded data; and
    during a specified period of time that falls within a period of time starting from a write-data transfer processing start notification sent to a host until a command completion notification sent to the host, executing rewrite processing of the data stored in the nonvolatile memory with reference to the error information.

8. A nonvolatile-memory rewriting method for a data storage device, according to claim 7, wherein:
    when the data is loaded into the volatile memory, data correction processing is executed, and error-address information is registered.

9. A nonvolatile-memory rewriting method for a data storage device, according to claim 7, wherein:
    if said rewrite processing is not completed in the timing when the command completion notification is ready to be transmitted to the host, the command completion notification is transmitted to the host after the completion of the rewrite processing.

10. A nonvolatile-memory rewriting method for a data storage device, according to claim 9, wherein:
    if a write cache of the data storage device is in an ON state, when all write data of the rewrite processing has been stored in a buffer, the rewrite processing is completed; and
    if the write cache of the data storage device is in an OFF state, when all write data of the rewrite processing has been written to the medium, the rewrite processing is completed.

11. A nonvolatile-memory rewriting method, used in a data storage device, according to claim 7, wherein:
    after initialization processing performed when power is turned ON, said rewrite processing is executed in an execution sequence of a first write command.

12. A magnetic disk drive comprising:
    a magnetic disk to which write data transferred from a host is written;
    a nonvolatile semiconductor memory configured to store control data, said nonvolatile semiconductor memory being electrically rewritable; and a controller configured to perform control operation according to control data stored in the nonvolatile semiconductor memory;

wherein:

when data is read out from the nonvolatile memory and the data is loaded into a volatile memory, said controller executes error-correction processing, and registers information about an error location thereof; and after initialization processing performed when power is turned ON, in an execution sequence of a first write command, said controller performs rewrite processing of data corresponding to the registered error location on the nonvolatile memory during a specified period of time that falls within a period of time starting from a write-data transfer processing start notification sent to a host until a command completion notification sent to the host.

13. A magnetic disk drive according to claim 12, wherein:

after completion of the write command processing, said controller judges whether or not the rewrite processing to the nonvolatile memory has been completed, and after the rewrite processing is completed, said controller transmits the command completion notification to the host.

14. A magnetic disk drive according to claim 13, wherein:

if a write cache of the data storage device is in an ON state, when all write data of the rewrite processing has been stored in a buffer, the rewrite processing is completed; and if the write cache of the data storage device is in an OFF state, when all write data of the rewrite processing has been written to the magnetic disk, the rewrite processing is completed.

* * * * *